(12) United States Patent
Ware

(10) Patent No.: US 7,581,078 B2
(45) Date of Patent: *Aug. 25, 2009

(54) MEMORY CONTROLLER FOR NON-HOMOGENEOUS MEMORY SYSTEM

(75) Inventor: Frederick A. Ware, Los Altos Hills, CA (US)

(73) Assignee: Rambus Inc., Los Altos, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 11/852,996

(22) Filed: Sep. 10, 2007

(65) Prior Publication Data

US 2007/0300038 A1    Dec. 27, 2007

Related U.S. Application Data

(63) Continuation of application No. 10/828,900, filed on Apr. 20, 2004, now Pat. No. 7,269,708.

(51) Int. Cl.
*G06F 12/06* (2006.01)

(52) U.S. Cl. .................................. 711/203; 711/154

(58) Field of Classification Search ............... 711/203, 711/154, 156, 129, 103, 134; 710/57, 54, 710/56

See application file for complete search history.

(56) References Cited

U.S. PATENT DOCUMENTS

| 6,088,767 | A | 7/2000 | Dan et al. .................... 711/129 |
| 6,178,132 | B1 | 1/2001 | Chen et al. ............. 365/230.02 |
| 6,219,763 | B1 | 4/2001 | Lentz et al. ................. 711/151 |
| 6,260,127 | B1 | 7/2001 | Olarig et al. ................. 711/167 |
| 6,397,292 | B1 * | 5/2002 | Venkatesh et al. ........... 711/114 |
| 6,578,127 | B1 | 6/2003 | Sinclair ....................... 711/202 |
| 6,720,643 | B1 | 4/2004 | Fox et al. .................... 257/686 |
| 7,293,009 | B2 * | 11/2007 | Jacobs et al. ................. 711/113 |
| 2004/0133747 | A1 | 7/2004 | Coldewey .................... 711/137 |
| 2005/0177675 | A1 | 8/2005 | Newman et al. ............... 711/5 |

OTHER PUBLICATIONS

Bhattacharya et al., "FET Gate Structure for Nonvolatile N-Channel Read-Mostly Memory Devices," IBM Technical Disclosure Bulletin, US IBM Corp., vol. 18, No. 6, p. 1768, 1976.

(Continued)

*Primary Examiner*—Pierre-Michel Bataille
(74) *Attorney, Agent, or Firm*—Morgan, Lewis & Bockius LLP

(57) ABSTRACT

A memory controller includes at least one interface adapted to be coupled to one or more first memory devices of a first memory type having a first set of attributes, and to one or more second memory devices of a second memory type having a second set of attributes. The first and second sets of attributes have at least one differing attribute. The controller also includes interface logic configured to direct memory transactions having a predefined first characteristic to the first memory devices and to direct memory transactions having a predefined second characteristic to the second memory devices. Pages having a usage characteristic of large volumes of write operations may be mapped to the one or more first memory devices, while pages having a read-only or read-mostly usage characteristic may be mapped to the one or more second memory devices.

25 Claims, 4 Drawing Sheets

OTHER PUBLICATIONS

"4Mb Smart 3 Boot Block Flash Memory," Micron Technology, Inc. (2001).

"4 MEG × 16 SyncFlash Memory," Micron Technology, Inc. (2001).

"SyncFlash and DRAM Mail Memory Subsystems in Pentium and Windows Applications," Micron Technology, Inc. (Mar. 2002).

* cited by examiner

MEMORY CONTROLLER FOR NON-HOMOGENEOUS MEMORY SYSTEM

RELATED APPLICATIONS

This application is a continuation of U.S. application Ser. No. 10/828,900, filed Apr. 20, 2004, entitled "Memory Controller for Non-Homogeneous Memory System," now U.S. Pat. No. 7,269,708, issued Sep. 11, 2007, which is incorporated herein by reference in its entirety.

TECHNICAL FIELD

The disclosed embodiments relate generally to memory systems and methods, and in particular to a memory controller for a non-homogeneous memory system.

BACKGROUND

Computer program code and data needed for execution of a process on a computer system typically resides in the computer system's main memory. The main memory of a computer system (e.g., DRAM), however, may not be large enough to accommodate the needs of the entire process. Virtual memory is a commonly used technique that allows processes that are not stored entirely within main memory to execute by means of an automatic storage allocation scheme. The term virtual memory refers to the abstraction of separating logical memory (i.e., memory as seen by the process) and physical memory (i.e., memory as seen by the processor). The virtual memory abstraction is implemented by using secondary storage to augment main memory in a computer system. Pages of data and program code are transferred from secondary storage to main memory as the data and program is needed by an executing process, and pages of data and program code are evicted from main memory and written to secondary storage when room is needed in main memory to store other pages of data and program code. The process of moving pages of data and program code back and forth between main memory and secondary storage is called by a variety of names, including swapping, paging, and virtual memory management.

In a virtual memory system, a program generated address or logical address, which typically includes a logical page number plus the location within that page, is interpreted or mapped onto an actual (i.e., physical) main memory address by the operating system using an address translation function. If the page is present in main memory, the address translation function substitutes the physical page frame number for the logical number. If the address translation function detects that the page requested is not present in main memory, a fault occurs and the page is read into a main memory page frame from secondary storage. This address translation function can be accomplished by using a directly indexed table, commonly referred to as a "page table," which identifies the location of the program's pages in main memory. If the page table indicates that a page is not resident in main memory, the address translation function issues a page fault to the operating system. This causes execution of the program which required the page to be suspended until the desired page can be read from secondary storage and placed in main memory. Further background regarding virtual memory management can be found in Richard W. Carr, *Virtual Memory Management*, UMI Research Press, Ann Arbor, Mich., 1984.

Portable computing devices typically use a single type of memory device at each level in their memory hierarchy. For example, portable computers (e.g., notebook computers) typically have at three or more hierarchical levels of memory, including secondary storage, main memory and cache memory. Often there are two or more levels of cache memory. Secondary storage is typically implemented with magnetic disk storage (often called hard disk storage). Main memory is typically implemented with Dynamic Random Access Memory (DRAM), and cache is typically implemented using Static Random Access Memory (SRAM). In some portable computers, such as personal digital assistants (PDA'S), the secondary memory is implemented using flash memory instead of magnetic disk storage.

DRAM has a near-optimal combination of operational attributes for implementing main memory. These attributes include, without limitation, low cost (only magnetic disk storage has a lower per-bit cost), low read time (the read access time is within an order of magnitude of that of the highest speed SRAM), low write time that is the same or similar to the read access time, and unlimited endurance (i.e., the storage cell can be rewritten an unlimited number of times).

SUMMARY

A memory controller for a non-homogeneous memory system is configurable to facilitate page operations between a virtual memory address space and physical pages of memory devices in the memory system. The memory devices, which collectively form the main memory of a computer or computer controlled device, include two or more memory device types (e.g., DRAM, Flash) with different attributes. A tag or other data structure associated with each page includes data indicative of the memory device, or type of memory device, in which the page is to be stored whenever the page is brought into main memory.

In some embodiments, virtual memory pages that are read-write, especially pages that may be written a large number of times, are mapped to a first portion of main memory implemented using one or more memory devices of a first type, while virtual memory pages that are read-only are mapped to a second portion of main memory, implemented using one or memory devices of a second type. In some embodiments, at least some virtual memory pages expected to be written to only a small number of times (i.e., pages having a "read mostly" usage characteristic) are mapped to the second portion of main memory.

In some embodiments, the second type of memory device has limited endurance while the second type of memory device has unlimited endurance. (For example, various types of NOR Flash memory have cycle endurances ranging from 1,000 cycles to 100,000 write cycles.) In some embodiments, the second type of memory device has substantially longer write time than read time, while the first type of memory device has substantially similar read and write time.

In some embodiments, the memory controller includes a write cache, used to temporarily store write data directed to pages in the second type of memory device. In some embodiments, an endurance table is adapted to track page operations directed to memory devices having limited endurance.

DESCRIPTION OF EMBODIMENTS

DRAM and Flash Memory Attributes

While DRAM has many advantages over other memory device types for implementing main memory in a computer system, it also has some disadvantages. For example, DRAM storage cells must be refreshed to maintain their contents even when the DRAM is not being accessed. Additionally, when power is removed from the system, the DRAM storage cells loose their stored information. In other words, data storage by DRAM devices is volatile. In the future, it is likely that the attributes needed by computer systems, such as portable computer systems, will no longer be optimally satisfied by DRAM devices. Indeed, it is possible that other memory device types (e.g., Flash memory) will have a cost per bit that is comparable or lower than DRAM memory. In addition, these alternative memory device types may have different attributes than DRAM. For example, Flash memory attributes include, without limitation, low cost (i.e., comparable to DRAM), low read time (i.e., the read access time is within an order of magnitude of that of the highest speed SRAM in the cache hierarchy), large write time (i.e., the write access time is large compared to the DRAM write access time), limited endurance (i.e., the storage cell may be written a limited number of times), non-volatile (i.e., Flash memory retains its contents without requiring periodic refreshing), and zero standby power (i.e., when power is removed from the system, Flash memory retains the stored information). The Flash memory attributes of low read time and non-volatility make Flash memory devices particularly attractive for use in portable computing applications. As explained below, however, replacing the magnetic disk storage with Flash memory is a suboptimal use of Flash memory.

System Overview

Figure 1:
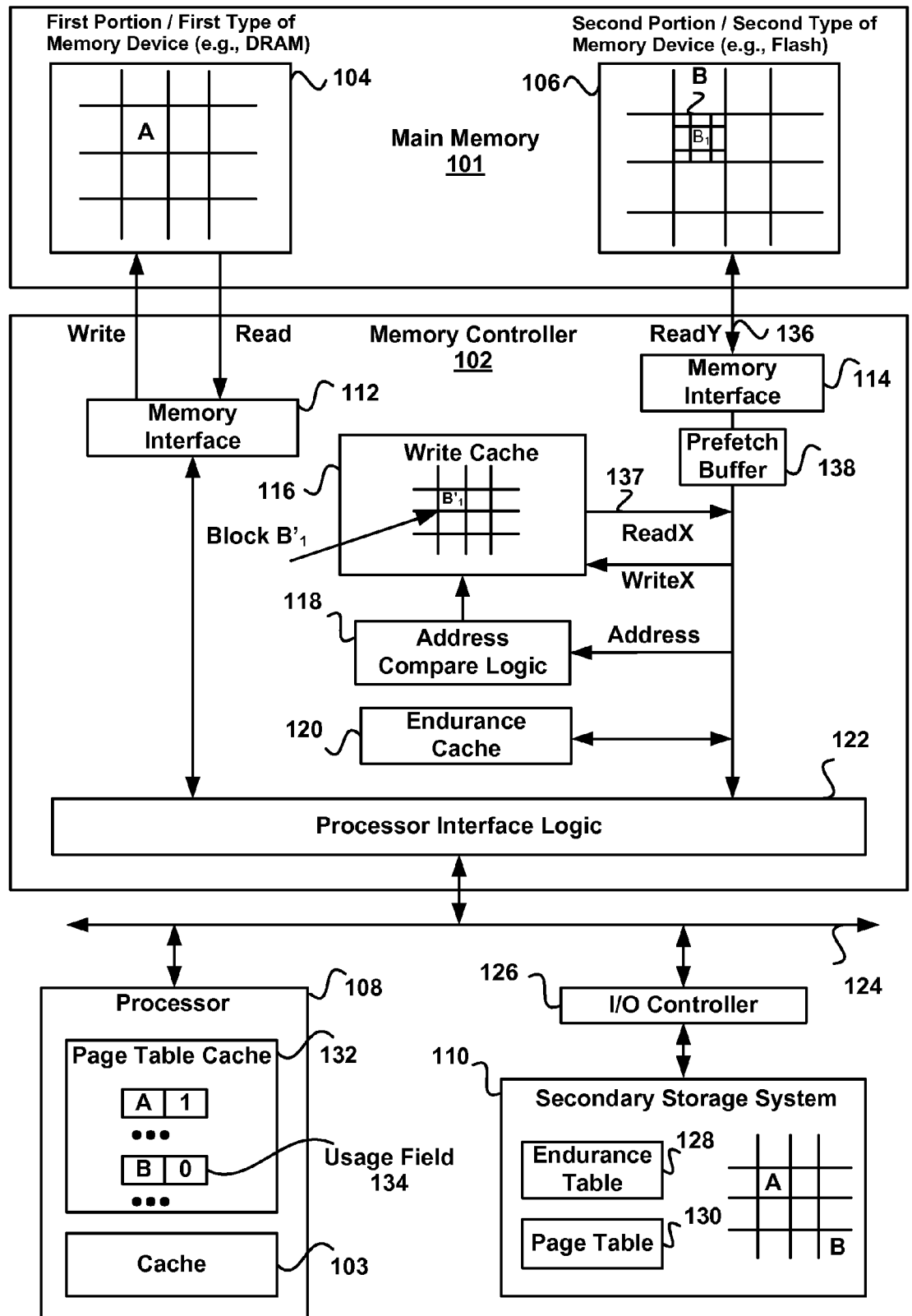
FIG. 1 is a block diagram of a system having non-homogeneous main memory.

FIG. 1 is a block diagram of a computer system 100 having a non-homogeneous main memory 101. The computer system 100 is includes a memory controller 102, main memory 101, one or more processors 108 and secondary storage 100 (e.g., a hard disk unit). In many embodiments, cache memory 103 forms a fastest level in the memory hierarchy, with main memory 101 and secondary storage 110 comprising two other levels of the memory hierarchy. In some embodiments, two or more levels of cache memory are provided, resulting a memory hierarchy with four or more levels. In some embodiments, the processor 108, I/O controller 126 and memory controller 102 may be separate components, while in other embodiments they may reside on a common component.

Main Memory

The main memory 101 includes a first portion 104 implemented with one or more memory devices of a first type (e.g., DRAM), and a second portion 106 implemented with one or more memory devices of a second type (e.g., NOR Flash, often simply called Flash memory). The main memory 101 stores programs and data used by processor 108 during execution of those programs.

Data can be distributed among the first and second portions 104, 106 of main memory 101 as well as secondary storage 110 in a manner designed to provide fast access to the data and programs that are most frequently used. In some embodiments, this distribution may be governed, at least in part, by a memory management policy implemented by the system 100.

The memory devices in the first and second portions 104, 106 of main memory are coupled to the memory controller 102 via memory interfaces 112 and 114, respectively. The memory devices in portion 104 have one or more attributes that differ from the attributes of the memory devices in portion 106. Examples of such attributes are: the ratio of write access time to read access time, volatility, and endurance.

For example, when the second portion 106 is implemented using Flash memory devices, the memory devices in the second portion have a write access time that is substantially greater than their read access time. For Flash memory, the write access time is sometimes called the erase-write time, because writing new data to a Flash memory device requires erasing the corresponding block of the memory device before new data is written to the memory device. A typical NOR Flash memory device may have a read access time of less than 100 ns, and an erase-write time of more than 1 millisecond. Thus, the ratio of write access time to read access time may exceed 10,000 to 1, and will typically be greater than 100 to 1. This attribute differs from the write access time of, for example, DRAM, which is typically about the same as the read access time of DRAM devices. For example, the read access time and write access time of a DRAM device are typically both less than 100 ns, and often both are between 20 ns and 40 ns. The ratio of write access time to read access time of DRAM devices is generally less than 4 to 1, and is typically less than 2 to 1. The first portion 104 and second portion 106 of main memory 101 occupy distinct portions of the main memory address space, sometimes called the physical memory address space, but share the same virtual memory address space used by programs during their execution by the processor 108.

In some embodiments, the first portion 104 of main memory 101 is implemented using one or more DRAM memory devices, and the second portion 106 of main memory 101 is implemented using one or more Flash memory devices (e.g., NOR Flash memory devices). In other embodiments, one or both portions of main memory 101 may be implemented using other types of memory devices. In some embodiments, main memory 101 may be implemented with more than two portions, implemented using more than two types of memory devices. For each such arrangement, the memory controller 102 can be configured to exploit the different attributes of the memory device types in the respective portions of main memory so as to improve one or more aspects of memory system performance.

Secondary Storage System

The secondary storage system 110 is coupled to the memory controller 102 via processor interface logic 122, I/O controller 126 and communication channel 124 (sometimes called bus 124). The secondary storage system 110 can be any type of file storage device, system or network, including without limitation, hard disk units, optical disks, Universal Serial Bus (USB) Flash, storage area networks (SANs), a wireless connection to a file server system or wireless local area network (WLAN), and any other file storage device, system or network having a file structure for storing virtual pages. In some embodiments, the second storage system 110 is a non-volatile repository for user and system data and programs. Uses of the secondary storage system 110 include storing various forms of programs (e.g., source, object, executable) and temporary storage of virtual pages (e.g., swap space). Information stored in the secondary storage system 110 may be in a variety of forms, including readable text and raw data (e.g., binary).

The secondary storage system 110 includes a file management system (not shown) for providing mapping between the logical and physical views of a file via one or more services and the I/O controller 126. Some basic services of the file management system include keeping track of files, I/O support (e.g., providing a transmission mechanism to and from main memory), management of the secondary storage system 110, sharing I/O devices, and providing protection mechanisms for the files and other information.

Page Table

A full description of virtual memory management and page table operation is outside the scope of this document, and furthermore is well understood by those of ordinary skill in the art of data processor design. Only those aspects of virtual memory management required for description of the present invention are presented here.

In embodiments that use virtual memory paging techniques, a page table is used to indicate the location of each logical page, either in main memory 101 or secondary storage 110. While the page table 130 is shown in FIG. 1 as being stored in secondary storage 110, portions of the page table may be stored in main memory 101, and furthermore the entries of the page table currently in use are stored within the processor 108 in a page table cache, sometimes called the translation look-aside buffer (TLB) 132. The page table entries in the TLB 132 map virtual memory pages to physical page frames in main memory. When the TLB 132 lacks a page table entry required for mapping a virtual memory address to a physical main memory address, an interrupt process is automatically invoked to bring the required page table entry into the TLB 132. If the virtual memory page containing the virtual memory address has not yet been assigned to a physical main memory page, one is assigned, and the page table entry is updated to reflect the assignment. Furthermore, if necessary, the virtual memory page may be initialized or swapped in from secondary memory.

In some embodiments, each page table entry in the TLB 132 includes a usage field 134 that designates the portion of main memory 101 to which the corresponding virtual memory page is mapped. In some embodiments, the usage field 134 of each entry comprises the most significant bit (MSB), or bits (MSBs), of the physical memory address of the page. In other embodiments, the usage field 134 does not comprise the MSB or MSBs of the page's physical memory address, but does specify the portion (104, 106) of the main memory 101 to which the page is mapped. In FIG. 1, a usage field value of "A" represents a page mapped to the first portion 104 of main memory 101, while a value of "B" represents a page mapped to the second portion 106 of main memory 101.

Endurance Table

NOR Flash memory devices typically have different granularity for read and write operations. In particular, the minimum unit for reading data from Flash memory may be a word (e.g., 16 bits) while the minimum unit for writing data to Flash memory is typically significantly larger than the minimum unit for reading, and is called either a block or a group of memory cells. In some Flash memory devices, each block includes between 1024 and 65,536 words, with blocks typically containing between 4 k (4096) and 32 k (32,768) words. Some Flash memory devices have blocks or groups of memory cells of two or more distinct sizes.

Furthermore, it may be noted that a page, which is the basic unit of data or storage in a virtual memory system is typically, but not necessarily, of a different size than a block in a Flash memory device. Thus, a page may be stored in a plurality of blocks, or one block could store multiple pages, or each page could be stored in a single block.

In embodiments in which a portion of main memory 101 is implemented using memory devices having limited endurance (e.g., Flash memory devices), an endurance table 128 is used to keep track of the number of write operations to each block of memory cells in the corresponding portion of main memory. In some embodiments, the endurance table 128 contains a distinct entry for each block of memory cells for which a write operations count is to be maintained. In other words, the endurance table 128 has a distinct entry for each distinct block of memory cells in each of the memory devices in the second portion of main memory.

In some embodiments, the endurance table is stored in secondary storage 110, to ensure that the endurance table 128 is retained when system power is turned off. The "endurance" of a memory device is defined as the maximum number of erase-write cycles that the memory device can support, which is a parameter typically included on data sheets for off-the-shelf memory non-volatile memory devices. The count values in the endurance table 128 are updated, maintained and checked to ensure that the endurance limit of the device is not exceeded (e.g., 10K cycles). For example, prior to performing a write operation on the second memory device 106, the operating system can check erase-write cycle count data stored in the endurance table 128 to determine whether to complete the write operation, or perform a contingency operation (e.g., write to a different block of memory or to a different portion of main memory).

In some embodiments, the erase-write cycle count for a block of memory cells is decremented by the memory controller 102 after each erase-write operation. Prior to each erase-write operation the cycle count for the block to be written is compared with zero (or other threshold value). If the count is equal to zero, the endurance limitation of the memory device has been reached with respect to the memory block corresponding to the count. In other embodiments, the erase-write cycle count is either incremented or decremented, and the resulting value is compared with a threshold value to determine if the endurance limitation has been reached. More generally, in these embodiments, the memory controller 102 utilizes an endurance table counting mechanism to ensure that the endurance limitation of each block of memory cells in the second portion 106 of main memory 101 (i.e., the portion implemented using memory devices of limited endurance) is not exceeded.

In other embodiments, an endurance table 128 is not employed. In such embodiments, other measures are employed to ensure that the endurance limitation of the memory devices in a portion 106 of main memory 101 are not exceeded. For instance, pages initially mapped to limited endurance memory devices may be remapped to unlimited endurance memory devices when predefined remapping conditions are satisfied. Such predefined remapping conditions may include conditions relating to write operations to a page initially mapped to a page frame in a limited endurance memory device. For instance, the predefined remapping condition for a page may be satisfied when more than N write operations are performed on the page (e.g., where N is a predefined non-negative integer value).

Processor

The processor 108 is coupled to the memory controller 102 via bus 124 and processor interface logic 122. The processor 108 can be any processor suitable for memory management and/or control, including without limitation, a central processing unit (CPU), a memory management chip or chip-set, an on-chip memory management unit (MMU) and the like. In some embodiments, the processor 108 includes a page table cache 132 (e.g., a translation look-aside buffer or TLB) for storing the physical address translations of recently referenced logical addresses.

Memory Controller

The memory controller 102 includes memory interfaces 112, 114 for coupling the memory controller 102 to the memory devices in two or more distinct portions (104, 106) of main memory 101, and processor interface logic 122. The memory interfaces 112 and 114 may include signal conditioning circuitry and other devices for transmitting addresses, data, and control signals to and from the memory devices in main memory portions 104 and 106.

In some embodiments, the first memory interface 112 includes circuitry for powering down, or reducing power to the memory devices in the first portion 104 of main memory 101 in response to a power reduction command from the memory controller 102 or the processor 108. Similarly, in some embodiments, the second memory interface 114 includes circuitry for powering down, or reducing power to the memory devices in the second portion 106 of main memory 101 in response to a power reduction command from the memory controller 102 or the processor 108.

In some embodiments, the memory controller 102 also includes a write cache 116 and address compare logic 118, both coupled to a communication path 136 (ReadY path). In some embodiments, the memory controller 102 includes an endurance counter and cache 120 coupled to path 136 (ReadY path). The path 136 is coupled to the bus 124 via the processor interface logic 122. The processor interface logic 122 may include signal conditioning circuitry and other devices for transmitting data, addresses and control signals to and from the bus 124. For example, the processor interface logic 122 may include decoding logic for decoding one or more bits of a physical address to determine whether the first or second portion of main memory will receive a memory access transaction, as described below with respect to FIG. 2.

In some embodiments, the ReadY path 136 couples the second portion 106 of main memory 101 to a streaming-type prefetch buffer 138. If the memory devices in the second portion 106 of main memory are non-volatile memory devices (e.g., Flash memory devices), it is likely that much of the information contained in those memory devices will be of a media nature and therefore access to that information could be made faster by the streaming-type prefetch buffer 138. The use of the prefetch buffer 138 could also save power, since the memory devices in the second portion 106 of main memory could be powered down in between prefetch accesses, particularly if the system was performing a single application like media playback.

It should be apparent that the memory controller 102 would typically include other hardware/software components (e.g., clock circuits, buffers, switches, power management circuits. etc.), which are not shown in FIG. 1 for clarity purposes. Such components are well-known in the field of memory system management and control.

Endurance Cache

The endurance counter and cache 120 stores the most recently used entries of the endurance table 128, and updates those entries (by decrementing or incrementing them) when a corresponding block write operation is performed. For example, prior to a write operation to a physical page in Flash memory address space, it may be necessary to check the endurance cache 120 to determine whether the endurance limit has been exceeded. If it is determined that the endurance limit has been exceeded, then the operating system can abort the write operation and/or perform a remedial operation (e.g., remapping the page in question to another memory block in the same portion of main memory, or remapping the page in question to a page frame in another portion of main memory).

Note that it is possible that the smallest set of storage cells (e.g., a block) that can be written to a memory device in the second portion 106 of main memory is smaller than the number of storage cells that are written by a single write transaction by the processor 108 (e.g., a word). If this is the case, a read-modify-write operation can be performed by the memory controller 102. The read-modify-write operation includes reading out the group, modifying the data corresponds to the word (or other unit) written by the processor, and then writing the group back to the memory device. Alternately, a write cache (described elsewhere in this document) can be used to accumulate written data, which is then written to the memory device at appropriate times (e.g., when data in the write cache requires flushing).

Write Cache Structure & Operation

A write cache 116 may be used in embodiments in which a portion of main memory 101 is implemented using memory devices (such as Flash memory devices) having either limited endurance, or write access time that is significantly longer than read access time, or both. The write cache 116 may be used both to hide the write access latency of such memory devices, and also to reduce write cycles to memory devices having limited endurance. When a block $B_1$ of a physical page B in a memory device in the second portion 106 of main memory 101 is to be written (e.g., because the processor 108 has written new data to one or more words in the block $B_1$), the write data is placed in a corresponding block $B_1'$ of the write cache 116.

In some embodiments, the write cache 116 is organized in an associative manner (e.g., fully associative, multiple set associative, etc.). This cache organization, as opposed to a directly mapped (one set) cache, reduces the number of write operations to the memory device(s) in the second portion 106 of main memory 101 caused by cache storage conflicts between a current write operation and data previously written to the write cache 116. For instance, if the write cache 116 is an N-way set associative cache, then data for up to N blocks having the same address tag can be stored in the write cache 116 before a block must be flushed from the write cache 116 to a corresponding memory device in the second portion 106 of main memory. If the write cache 116 is fully associative, then a write operation by the processor 108 will cause a block to be flushed from the write cache 116 only if the write cache is full (i.e., all the blocks in the write cache 116 are occupied by valid write data), and the processor attempts to write to another block (herein called the current block) not present in the write cache 116.

Whenever the write cache 116 is unable to store data written by the processor 108 without performing a flush operation, one of a number of remedial operations must be performed: either one or more blocks must be flushed from the write cache 116 to one or more memory devices in the second portion 106 of main memory 101, or the current block must be written directly to a memory device in the second portion 106 of main memory 101, or a page of data mapped to the second portion 106 of main memory 101 must be remapped and copied to the first portion 104 of main memory 101, thereby freeing the corresponding blocks in the write cache 116. In other embodiments, other remedial actions may be taken.

In one embodiment, the remedial operation performed is to flush one or more blocks from the write cache 116 to one or more memory devices in the second portion 106 of main memory 101. In another embodiment, the remedial operation performed depends on an endurance count associated with either the current block or the block to be flushed from the write cache 116. If the endurance count indicates a number of write operations above a threshold level, the remedial action performed is to remap and copy the corresponding page to a page frame in the first portion 104 of main memory 101. Otherwise, the remedial action performed is the aforementioned flush operation. As already indicated, in other embodiments, other remedial actions may be taken.

When a write operation to a current block $B_1$ is received by the memory controller 102, the address compare logic 118 compares the address against addresses of the corresponding blocks in the write cache 116. If there is a match, the new write data is written back to block $B_1'$ in the write cache 116. If there is no match, an available block in the write cache 116 becomes block $B_1'$ and is written with the data.

The address compare logic 118 includes various logic devices configured to compare the physical addresses issued by the processor 108 with the address tags of entries in the write cache 116, and to determine when data corresponding to the specified address is present in the write cache 116. The address compare logic 118 may be considered to be an integral part of the write cache 116.

If a read operation to block $B_1$ in the second portion 106 of main memory 101 is received, the physical address is compared against physical addresses of blocks in the write cache 116. This comparison may be performed by the address compare logic 118. If there is a match, the contents of block $B_1'$ in the write cache 116 are returned via the ReadX path 137 shown in FIG. 1. If there is no match, the contents of block $B_1$ in a memory device in the second portion 106 of main memory 101 is returned via the ReadY 136 path shown in FIG. 1.

Power State Transitions

In some embodiments, the system 100 operates in at least two power modes: normal mode and low power (standby) mode. In low power mode, the first portion 104 of main memory 101 is completely disabled (e.g., power is removed). When transitioning to low power mode, all pages currently mapped to page frames in the first portion 104 of main memory are preferably swapped back out to secondary storage 110. When the processor 108 thereafter requires use of any page not in main memory 101, the page will be mapped to a page frame in the second portion 106 of main memory 101.

In low power mode, a limited set of application and/or operating system processes can be executed using only the second portion 106 of main memory 101, together with the write cache 116. Preferably, the application and operating system processes are restricted from performing write operations that exceed the capacity and endurance limitations of the memory devices in the second portion 106 of main memory. If these constraints can be satisfied, then the system 100 may transition into a low power mode in which the first portion 104 of main memory 101 is not drawing power, and the second portion 106 of main memory 101 is drawing very little power. If the memory devices of the second portion 106 of main memory 101 are non-volatile, and all power is removed from main memory 101, the contents of the memory devices in the second portion 106 of main memory 101 can be retrieved once power is restored, i.e., it is not necessary to restore the contents of the pages mapped to the second portion 106 of main memory 101 from secondary storage 110.

Figure 4:
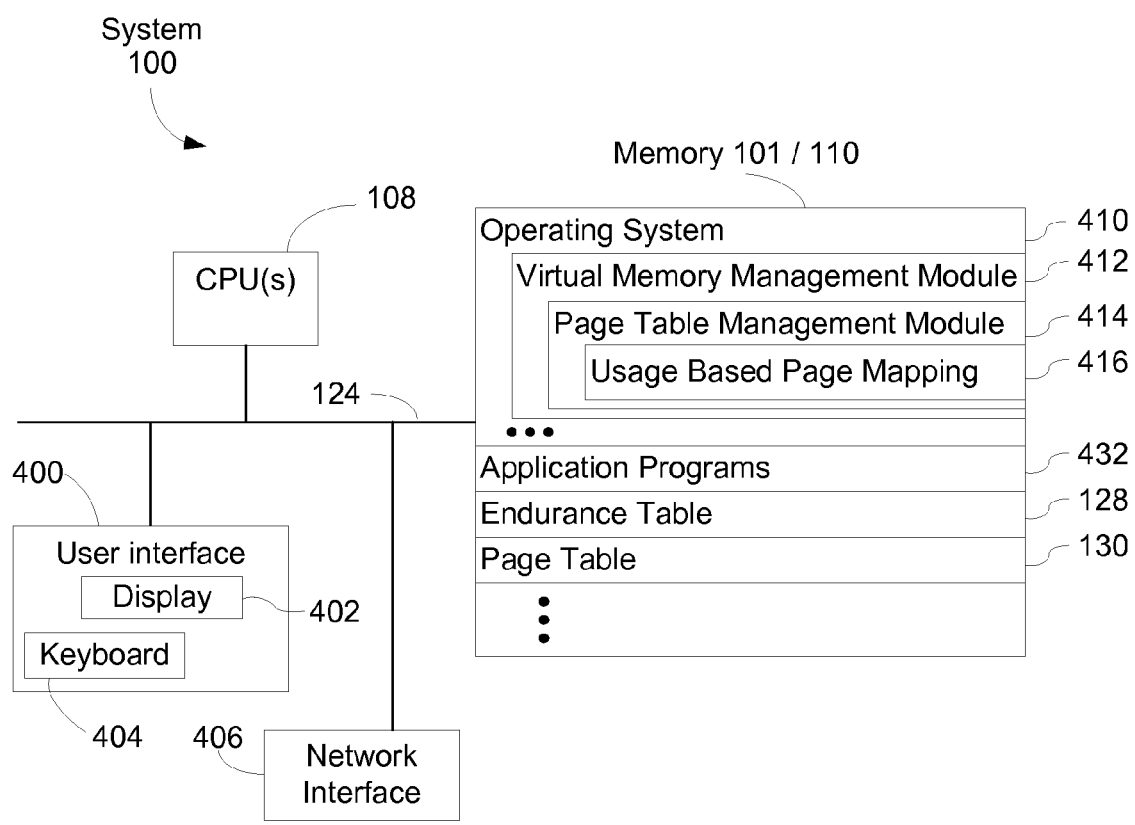
FIG. 4 is another block diagram of a computer system having non-homogenous main memory.

FIG. 4 provides another view of the system 100. The system includes main memory 101 and secondary storage, shown here in aggregate. The system also includes one or more processors (CPU(s) 108) and may optionally include a user interface 400 (e.g., having a display 402 and keyboard 404 or other user interface devices) and may optionally include a network interface 406. These components may be interconnected by one or more busses or other interconnect mechanisms 124.

The system's memory 101/110 stores computer programs and data, including an operating system 410, which includes a virtual memory management module or procedures 412, as well as application programs 432. The virtual memory management module 412 include instructions or a module 414 for page table management, such as for creating and updating the page table entries in the page table 130. In some embodiments, the page table management module or instructions 414 include instructions 416 for usage based page mapping. In particular, the usage based page mapping instructions or module 416 include instructions for setting the usage field 134 in at least a plurality of page table entries based on actual or expected usage of the corresponding pages. As indicated elsewhere, in some embodiments, pages containing computer program code may be initially mapped to a portion of main memory reserved for pages that are either read-only or are expected to have a "read mostly" usage characteristic, while other pages may be initially mapped to a portion of main memory implemented using DRAM or other memory devices suitable for handling a high volume of both read and write operations.

Data Structure For Managing Page Operations

Figure 2:
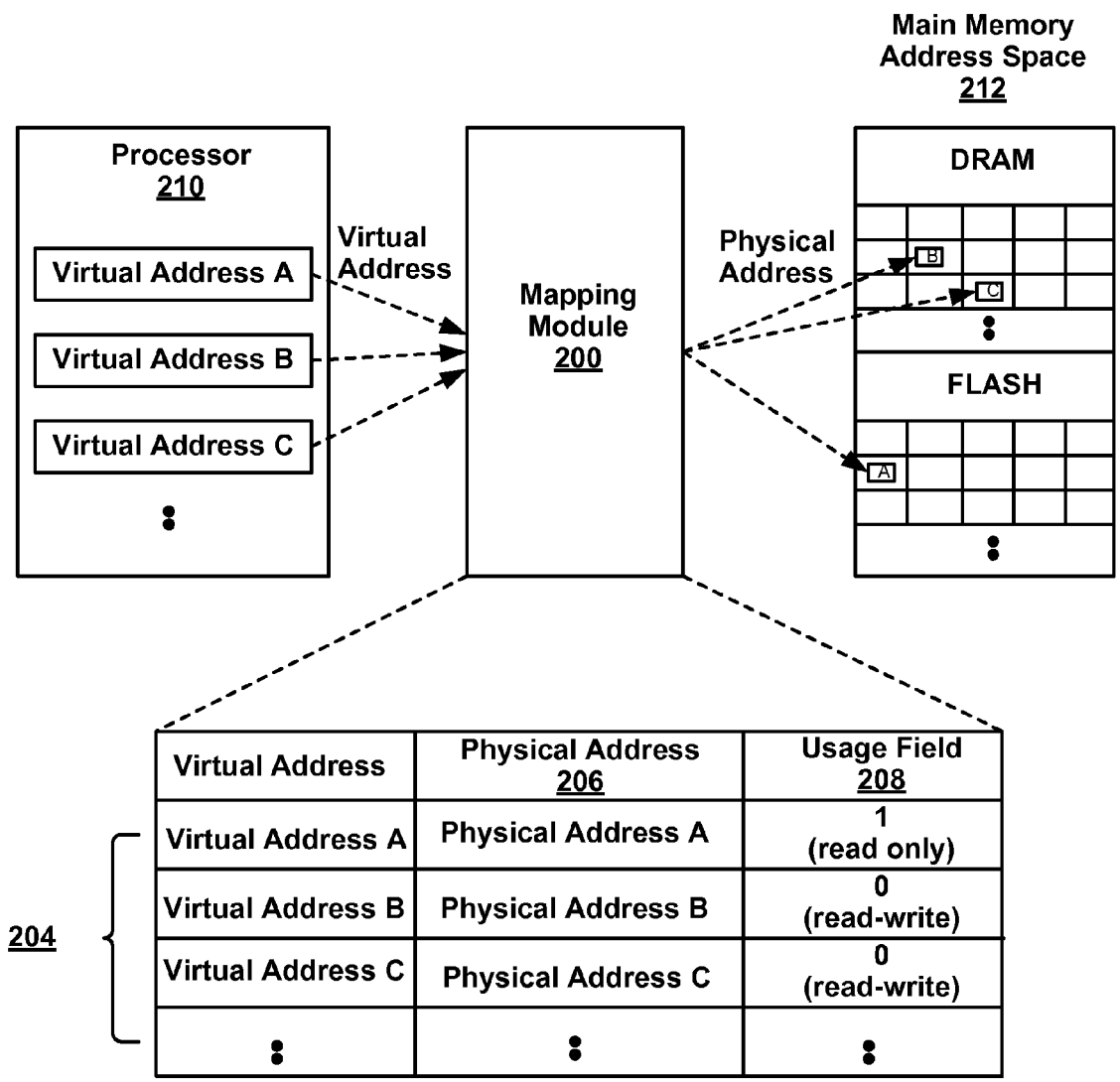
FIG. 2 is a diagram illustrating an embodiment of a data structure for managing page operations in a non-homogeneous memory system.

FIG. 2 is a diagram illustrating an embodiment of a mapping module 200 for managing page operations in a computer system having non-homogeneous main memory. The mapping module 200 (e.g., TLB 132) includes entries 204 for the most recently used pages in main memory 101. Each entry 204 includes a field 206 for storing the physical address to which a virtual address maps and a usage field 208 (i.e., tag). More or fewer fields may be included in the entries 204 of the mapping module 200 depending upon the architecture of the computer system 100.

The usage field 208 stores data indicative of the usage model of the page, which can be used by the processor 210 to exploit the unique attributes of a physical memory device associated with the main memory address space 212. For example, when the processor 210 issues a write operation to page A (and page A is not currently stored in main memory 101), then the usage field 208 for page A is read from a page table cache or TLB. If the usage field 208 contains a logic '1', then page A is retrieved from the secondary storage 110 and written to a page frame (i.e., at a corresponding physical address) in a memory device (e.g., a Flash memory device) in the second portion 106 of main memory. If the usage field 208 contains a logic '0', then page A is written to a page frame in a memory device (e.g., DRAM) in the first portion 104 of main memory 101. Since pages B and C each have a logic '0' in their respective usage fields 208, these pages will be written to corresponding physical addresses in the first portion 104 of main memory.

In the above example, the usage field 208 is a one-bit flag that indicates whether the requested page is expected to be read-only or whether it is to be read-write. It should be apparent, however, that the usage field 208 can represent other page usage models, and include more or fewer bits. In some embodiments, the usage field 208 includes a bit which is appended to the physical address (e.g., as a most significant bit or MSB). The MSB can then be decoded by decoder logic in the processor interface logic 122 to determine which portion of main memory 101 will receive the page transaction.

Data Structure Initialization

In some embodiments, the usage field 208 for a page is set by hardware and/or software contained within the system 100, or it could be set by hardware or software external to the system 100. For example, the value to be stored in usage field 208 for a particular page can be determined when the software stored in the page is compiled. Alternatively, the value to be stored in usage field 208 may be determined by the operating system or by the system hardware at the time that the page is transferred from secondary storage 110 to main memory 101. In some embodiments, the usage field 208 is set or changed during operation of the system based on one or more events.

In some embodiments, a page of data or program code can be first moved into the first portion 104 of main memory, and later moved to the second portion 106 of main memory after it has been determined that no write operations are being directed to the page. This determination could be made by, or with the assistance of, hardware (e.g., the memory controller 102) configured to keep usage data for each page of physical memory in the first portion 104 of main memory. The usage field 208 of each page in main memory 101 can be set based on the accumulated usage data. Similarly, a virtual page can be first moved into the second portion 106 of main memory, and later move to the first portion 104 of main memory if a write operation is directed to the page.

Process Flow

Figure 3:
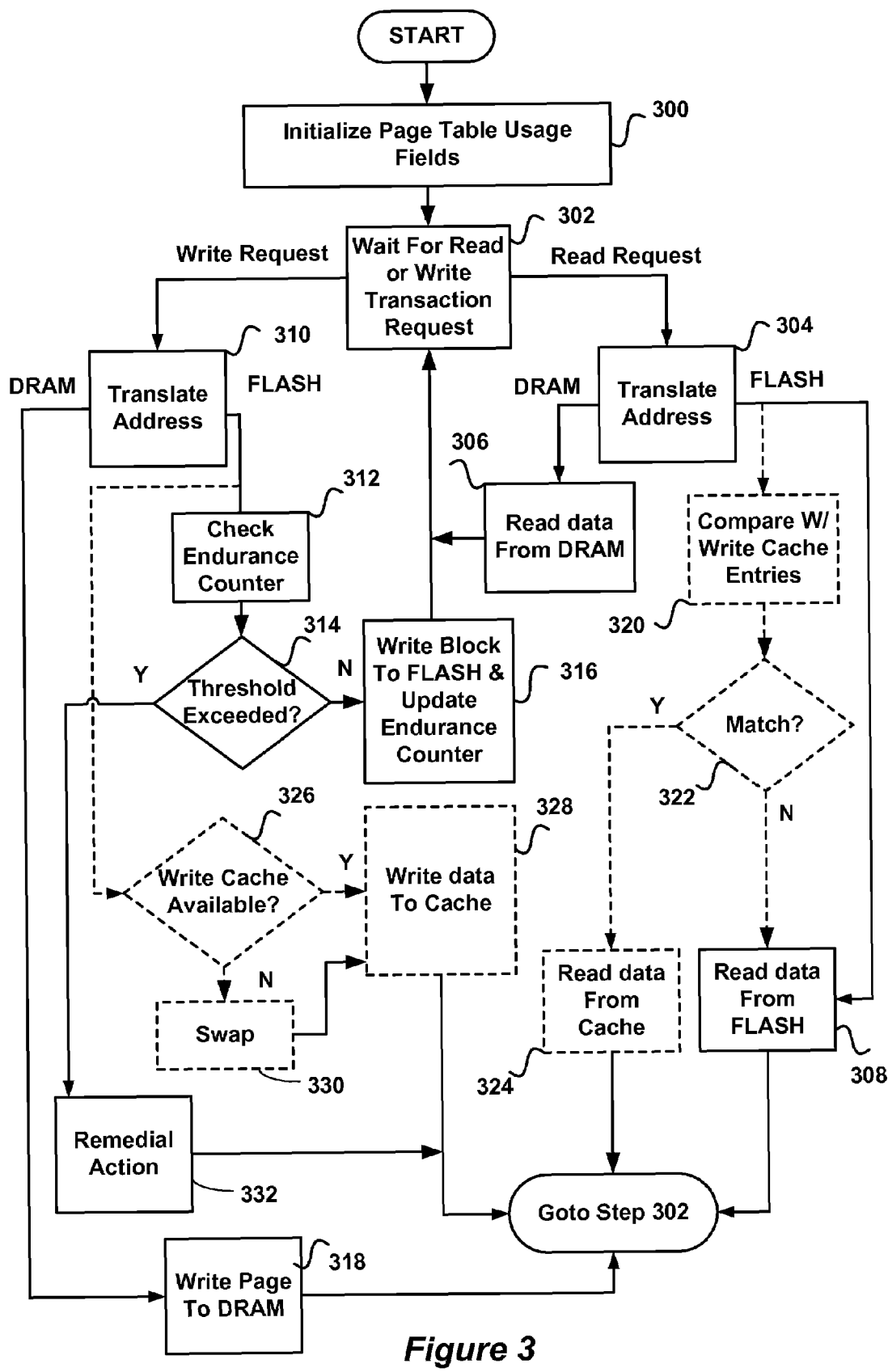
FIG. 3 is a flow diagram of an embodiment of a non-homogeneous memory process.

FIG. 3 is a flow diagram of an embodiment of a non-homogeneous memory management process. The process flow is for a memory system in which a first portion of main memory is implemented using DRAM memory device and a second portion of main memory is implemented using Flash memory device. It should be apparent, however, that more or fewer memory device types can be used with the memory system, as needed, based on the architecture of the memory system.

The process begins by initializing 300 usage fields in a page table located in secondary storage system and having a corresponding page table cache located near the processor core for storing the most recently used page table entries. The usage fields can be filled by internal or external hardware and/or software. In alternative embodiments, the usage fields are filled or changed based on a page usage model (e.g., static or dynamic) or other trigger events (e.g., power state transition). After the initialization phase is complete, the memory controller waits 302 for a read or write transaction request. If a read request is received, the virtual address is translated into a physical address at step 304. The process for translating a virtual address to a physical address is discussed above. One aspect of step 304 is reading the usage field for the page. If the usage field indicates that the page (i.e., the page containing the specified address from which data is to be read) should be read from DRAM, then the data (which may contain program code) is read at step 306 from DRAM and returned to the requestor. The process then returns to step 302 to wait for another read or write transaction request. If the usage field indicates that the page containing the specified address should be read from Flash memory, then the data is read at step 308 from Flash memory and returned to the requester, after which the process returns to step 302 to wait for another read or write transaction request.

In an alternative embodiment (indicated by the dashed line), the physical address is compared 320 with entries in a write cache. If there is a match 322, the requested data is read 324 from the write cache and the process returns to step 302 to wait for another transaction request. If there is no match 322, then the requested data is read from the Flash memory and the process returns to step 302 to wait for another transaction request.

If the transaction request is a write request, the virtual address is translated into a physical address at step 310, which once again includes reading the usage field for the page containing the specified address. If the usage field indicates that the write data should written to DRAM (i.e., to a first portion of main memory), then the write data is written to DRAM at step 318, and then the process returns to step 302 to wait for another transaction request. If the usage field indicates that the write data should be written to Flash memory (i.e., to a second portion of main memory), then an entry in an endurance table corresponding to the memory block containing the specified address is checked 312. If the entry indicates that the number of read-write cycles exceeds 314 a threshold, then a remedial action is taken 332, after which the process returns to step 302 to wait for another transaction request. In some embodiments, the remedial action 332 is to remap the specified page (i.e., the page containing the specified address) to the portion of main memory implemented using DRAM devices and then write the page to DRAM. In some embodiments, the remedial action is to remap the specified page to another page frame in the second portion of main memory (i.e., in the same portion of main memory as before). If the number of read-write cycles does not exceed 314 the threshold, then the write data is written to Flash memory and the corresponding endurance counter is updated 316. The process then returns to step 302 for another read or write transaction request.

In embodiments that include a write cache (dashed line), the availability of write cache capacity is checked 326 after performing the virtual to physical address translation step 310. If the write cache already has a valid entry for the block containing the address to which data is to be written, or if the write cache has an available block that can be used to store the block containing the address to which data is to be written, then the write data is written 328 to the write cache, and the process returns to step 302 for another page transaction request. If all the entries in the write cache that could be used to store the block containing the specified address are occupied by other blocks (326), then a swap operation is performed at step 330. Prior to performing the swap operation, the write cache is in a state in which it cannot fully process the write operation. The swap operation will typically include evicting one or more blocks of data from the write cache, writing the one or more evicted blocks of data to one or more Flash memory devices in main memory so as to produce one or more free entries in the write cache, and copying the specified block from Flash memory into the write cache. The specified block is typically copied from main memory to the write cache because the write operation will typically modify only a small portion of the block, but when the block is written back to main memory, the entire block must be written back to the Flash memory device in main memory. The swap operation 330 frees up one or more entries in the write cache and may take a significant amount of time (e.g., 0.25 to 1.0 seconds). In some embodiments, the write cache may include a buffer for temporarily storing one or more write transactions, and to thereby partially mask the latency associated with writing a block of data evicted from the write cache back to a Flash memory device. Once the swap operation is completed, the write data from the current write operation is written into an appropriate entry in the write cache 328.

In an alternate embodiment, when the write cache does not have an entry available for storing the write data from a write transaction, the associated page is remapped to a page frame in another portion (e.g., the DRAM portion) of main memory, and then write data is written to that page frame. In some embodiments, the latency associated with remapping and copying a page from Flash memory to DRAM may be considerably less than the latency associated with writing a block of data (evicted from the write cache) to a Flash memory device.

By using a write cache, write transactions to the Flash portion of main memory may be performed without actually performing a write transaction to the Flash memory devices. While most of the data in the write cache will be written to a Flash memory device in the Flash portion of main memory, the average latency associate with write operations to the Flash portion of main memory is drastically reduced (e.g., typically by a factor of more than ten to 1) compared to the latencies that would be encountered when using a memory controller without a write cache.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A controller, comprising:
at least one interface adapted to be coupled to one or more first memory devices, comprising volatile memory devices, and one or more second memory devices, comprising non-volatile memory devices; and
interface logic coupled to the at least one interface to direct memory transactions having a predefined first characteristic to the first memory devices and to direct at least some memory transactions having a predefined second characteristic to the second memory devices, wherein the second characteristic comprises a usage characteristic selected from the group consisting of a read-mostly characteristic and read-only characteristic; and wherein the usage characteristic of at least some memory transactions is updated during operation.

2. The controller of clam 1, wherein the second memory devices have a limited write operation endurance.

3. The controller of claim 2, further comprising:
an endurance counter for counting a number of write operations to a block of memory cells in the one or more second memory devices.

4. The controller of claim 2, further comprising:
a set of endurance counters for counting the number of write operations to each block of memory cells in the one or more second memory devices.

5. The controller of claim 1, further comprising:
a write cache for storing data associated with write operations directed to any of the one or more second memory devices.

6. The controller of claim 5, wherein the controller is configurable to write data stored therein to the one or more second memory devices.

7. The controller of claim 5, wherein the controller is adapted to relocate one or more pages from the one or more second memory devices to the one or more first memory devices when a predefined write cache state occurs.

8. The controller of claim 1, wherein the one or more first memory devices are Dynamic Random Access Memory (DRAM) devices and the one or more second memory devices are Flash memory devices.

9. The controller of claim 1, wherein the memory controller is configurable to move pages from the one or more first memory devices to secondary storage and to then power down the one or more first memory devices.

10. The controller of claim 1, wherein the controller is adapted for use in conjunction with a processor having virtual memory logic for mapping virtual memory addresses into physical memory addresses and page logic for assigning physical memory addresses to virtual memory addresses, wherein the page logic is configured to assign physical memory addresses in the one or more first memory devices to virtual memory addresses associated with a first usage characteristic, and to assign physical memory addresses in the one or more second memory devices to virtual memory addresses associated with a second usage characteristic.

11. A controller, comprising:
interface means for coupling the controller to one or more first memory devices comprising volatile memory devices and to one or more second memory devices comprising non-volatile memory devices; and
logic means coupled to the interface means for directing memory transactions having a predefined first characteristic to the first memory devices and for directing at least some memory transactions having a predefined second characteristic to the second memory devices, wherein the second characteristic comprises a usage characteristic selected from the group consisting of a read-mostly characteristic and read-only characteristic, and wherein the usage characteristic of at least some memory transactions is updated during operation.

12. A system, comprising:
at least one interface adapted to be coupled to one or more first memory devices of a first memory type having a first set of attributes and to one or more second memory devices of a second memory type having a second set of attributes, wherein the first and second sets of attributes have at least one differing attribute;
interface logic coupled to the at least one interface and configured to direct memory transactions having a predefined first characteristic to the first memory devices and to direct memory transactions having a predefined second characteristic to the second memory devices; and
a processor having virtual memory logic for mapping virtual memory addresses into physical memory addresses and page logic for assigning physical memory addresses to virtual memory addresses, wherein the page logic is configured to assign physical memory addresses in the one or more first memory devices to virtual memory addresses associated with a first usage characteristic, and to assign physical memory addresses in the one or more second memory devices to virtual memory addresses associated with a second usage characteristic.

13. The system of claim 12, wherein the first usage characteristic comprises memory usage that includes both read and write operations.

14. The system of claim 13, wherein the second usage characteristic comprises memory usage that includes only read operations.

15. The system of claim 13, wherein the second usage characteristic comprises memory usage that includes read operations and less than a threshold amount of write operations.

16. The system of claim 12, wherein the processor includes a page table cache having entries that include a field whose value is set by the processor in accordance with the first and second usage characteristics.

17. The system of claim 12, including a page table, for mapping virtual memory pages to physical memory pages, having a plurality of entries that include a field whose value is set in accordance with whether corresponding virtual memory pages are associated with the first or second usage characteristic.

18. The system of claim 17, wherein the system is configured to change the value of the field in an entry of the page table based on usage of the corresponding page.

19. The system, comprising:
   interface means for coupling to one or more first memory devices of a first memory type having a first set of attributes and to one or more second memory devices of a second memory type having a second set of attributes, wherein the first and second sets of attributes have at least one differing attribute;
   logic means coupled to the interface means for directing memory transactions having a predefined first characteristic to the first memory devices and to direct memory transactions having a predefined second characteristic to the second memory devices; and
   virtual memory means for mapping virtual memory addresses into physical memory addresses and page means for assigning physical memory addresses to virtual memory addresses, wherein the page means assigned physical memory addresses in the one or more first memory devices to virtual memory addresses associated with a first usage characteristic, and assigns physical memory addresses in the one or more second memory devices to virtual memory addresses associated with a second usage characteristic.

20. A method of managing memory in a non-homogeneous memory system, comprising:
   establishing a plurality of page table entries, each entry in the plurality of page table entries mapping a virtual memory page address to a physical memory page address, each said entry including a usage field identifying a respective portion of main memory in which the physical memory page address is located, wherein the main memory includes at least two distinct portions, including a first portion implemented with one or more first memory devices of a first memory type having a first set of attributes and a second portion implemented with one or more second memory devices of a second memory type having a second set of attributes, wherein the first and second sets of attributes have at least one differing attribute;
   receiving a memory transaction request;
   translating a virtual address of a page associated with the memory transaction request into a physical address in accordance with a corresponding page table entry of the plurality of page table entries, the physical address comprising a physical address in a respective portion of main memory;
   directing the memory transaction to the physical address in the respective portion of main memory.

21. The method of claim 20, wherein the first memory devices are volatile memory devices, the first set of attributes include an unlimited endurance characteristic, the second memory devices are non-volatile memory devices, and the second set of attributes include a limited endurance characteristic.

22. The method of claim 20, wherein the second memory devices are non-volatile memory devices and the first memory devices are volatile memory devices.

23. The method of claim 20, farther comprising:
   determining if an endurance limitation associated with one of the second memory devices has been exceeded; and
   redirecting the memory transaction if the endurance limitation not been exceeded.

24. The method of claim 20, wherein the second memory devices are non-volatile memory devices, and the method includes:
   redirecting at least one write operation directed to one of the second memory devices to a write cache.

25. The method of claim 20, including moving pages from the one or more first memory devices to secondary storage and then powering down the one or more first memory devices.

* * * * *

UNITED STATES PATENT AND TRADEMARK OFFICE
CERTIFICATE OF CORRECTION

PATENT NO. : 7,581,078 B2  Page 1 of 1
APPLICATION NO. : 11/852996
DATED : August 25, 2009
INVENTOR(S) : Ware et al.

It is certified that error appears in the above-identified patent and that said Letters Patent is hereby corrected as shown below:

In the Claims:

Col. 13, line 62, please delete "clam" and add -- claim --.

Col. 16, line 35, please delete "farther" and add -- further --.

Signed and Sealed this

Seventeenth Day of November, 2009

David J. Kappos
*Director of the United States Patent and Trademark Office*